Patented July 2, 1929.

1,719,177

UNITED STATES PATENT OFFICE.

HERBERT A. GOLLMAR, OF EAST ORANGE, NEW JERSEY, ASSIGNOR TO THE KOPPERS COMPANY, A CORPORATION OF DELAWARE.

GAS-PURIFICATION PROCESS.

No Drawing. Application filed March 7, 1927, Serial No. 173,614. Renewed October 24, 1928.

This invention relates to the purification of gases from hydrogen sulphide, hydrogen cyanide and analogous acidic impurities. My invention relates especially to a gas purification process employing recirculation of a solution of an arsenic compound or the like through a cycle comprising an absorption stage and an actification stage. Such processes are described and claimed in the copending application of David L. Jacobson, Serial No. 146,571, and my copending application Serial No. 146,569, both filed Nov. 5, 1926.

An object of my invention is to provide a process of purifying gas in which materials utilized for producing an alkaline condition and an active compound in the gas purification solution are considerably less expensive than those which have been used heretofore.

A second object of my invention is to prevent the precipitation of valuable constituents of a gas purification solution, due to interaction with constituents of the gas being purified.

My invention has, for further objects, such other operative advantages or results as may hereinafter be found to obtain.

In my invention, I provide a process of gas purification in which a solution containing an alkaline earth metal compound, and preferably an alkaline earth metal thio-arsenic compound, is circulated over gas to be purified for removal of acidic impurities from said gas, and through an actification stage. In previous attempts to utilize solutions or suspensions of alkaline earth metal compounds for gas purification, considerable amounts of alkaline earth metal have been precipitated in the form of carbonate, due to reaction with carbon dioxide, which is a constituent of such gas. This precipitation has resulted in the virtual abandonment of such attempts, due to the high consumption of alkaline earth metal compound. I have found that, when solutions of alkaline earth metal arsenic or thio-arsenic compounds are used for gas purification, carbon dioxide in said gas does not cause a precipitation of alkaline earth metal carbonate therefrom. Consequently, I provide a process of gas purification employing such a compound and a method of forming such an active and non-precipitable compound of the nature indicated.

The compound which I prefer to maintain in my gas purification solution is an alkaline earth metal thio-arsenic compound, such as, for example, $CaHAsS_3O$ or $MgHAsS_3O$, but my invention is not limited to such specific examples. Such compounds are not precipitated by carbon dioxide. They may readily be prepared by sulphiding a hot suspension of alkaline earth and arsenous oxide and subsequently filtering and aerating the solution until the yellow color produced by the sulphidation is eliminated. Such a solution may be further sulphided and subsequently revivified by aeration with liberation of free sulphur but without liberation of hydrogen sulphide. This solution is recirculated through the usual gas purification cycle comprising an absorber and an actifier. In the latter, revivification is preferably effected by aeration with finely comminuted air. The specific example given above is probably the simplest example of a gas purification system utilizing an alkaline earth metal thio-arsenic compound and represents an operative and feasible process. However, there are certain precautions which I have found advisable in operating such a process on a large scale. These may best be illustrated by a description of a preferred method of actually operating a gas purification plant.

Such a plant is preferably comprised of the usual hurdle type absorber for treating the impure gas with the solution, an actifier that is preferably of the "thionizer" type, comprising a tank provided with foraminous aerators for introducing finely comminuted air, and means for recirculating the solution through said absorber and said thionizer. This apparatus is substantially identical with that employed for the purification of gas with an alkaline suspension of an iron compound.

The gas purification system is filled with water and sufficient alkaline earth is added to make a suspension of about 2% strength. This suspension is circulated through the absorber in contact with the gas and through the actifier or thionizer, but no air is blown through the suspension in the thionizer. After the circulation has proceeded for about three hours, arsenous oxide or a solution thereof is added at the rate of about 0.1% to 0.2% per hour, depending upon the specific alkaline earth metal compound employed.

I prefer to make my gas purification solution of such a strength that it will contain in solution about 0.8% of arsenic considered as $As_2O_3$.

When solid arsenous oxide is added to the system, it is desirable to maintain the arsenous oxide in suspension until it is sulphided and dissolved and to this end agitation, but not aeration, may be employed in the thionizer. When the arsenic in solution reaches the preferred concentration, aeration is commenced in the thionizer. Meanwhile, the solution is preferably maintained at a temperature of about 60° C. When sulphur begins to be liberated in the thionizer, it is an indication that an active alkaline earth metal thio-arsenic compound has been formed. The temperature of the solution may then be lowered to about 30 to 40° C., which is the preferred temperature for subsequent operation.

During the subsequent operation of my process, due to mechanical losses, side reactions and the like, additions of arsenic and alkaline earth will be required to maintain the preferred strength of the solution. When alkalinity additions become necessary, alkaline earth is added to the system. It is preferred to maintain an alkalinity of about 0.05% to 0.1%, although lower or higher alkalinities may be employed, as, for example, when necessary to insure complete absorption of large amounts of impurities from the gas being purified. But the alkalinity of the system is not apparently an index of the concentration of alkaline earth metal in solution. When a yellow precipitate appears, causing a discoloration of the normally white sulphur foam, it is an indication that there is a deficiency of alkaline earth metal in solution and sufficient additions of an alkaline earth metal compound are made to cause this precipitate or discoloration to disappear.

When it becomes necessary to add arsenic to the solution, this may be done in a number of ways. Arsenous oxide or other arsenic compound may be added directly to the system, care being taken to maintain the oxide in suspension until solution results. I prefer, however, to use a material comprising an intimate mixture of an alkali, such as sodium carbonate, and arsenous oxide, as described and claimed in my copending application Serial No. 173,613. Such material may be added directly to the system, or it may be dissolved, and the solution added to the system. The use of such material facilitates solution of the arsenic without requiring the use of large amounts of alkali, and avoids the formation of large amounts of sodium thiosulphate as side product, entailing a costly consumption of alkali. Moreover, this side product is not readily marketable.

In my process, the side reactions result largely in the formation of such compounds as calcium thiosulphate and calcium thiocyanate, which are readily marketable and the formation of which entails only the consumption of a relatively cheap source of alkalinity. Moreover, the low basicity of the alkaline earth metal compound results in a decrease in the rate of side reactions and the formation of side products.

It should be noted that solution of alkaline earth is facilitated by $CO_2$ that is present in the fuel gas being purified or is otherwise supplied, resulting in the formation of soluble alkaline earth metal bicarbonate. In this bicarbonate, the alkaline earth metal is in an "available" position, and readily enters the thio-arsenic compound, replacing alkali metal consumed in side reactions, mechanical losses, and the like.

It will be understood that any of the alkaline earth metals may be used in operating my process. Consequently, I do not limit my invention to any one of them, nor is my invention limited to the use of alkaline earths themselves as other alkaline earth metal compounds may be employed.

While I have described my invention with relation to the use of arsenic, it will be understood, by reference to the above-recited copending applications, that compounds of the other metals of the so-called "tin" group of qualitative analysis, such, for example, as antimony and tin, may be employed. Nor is my invention limited to the use of the oxide of any of such metals as they may be added in any convenient form suitable for conversion into the active compound which it is desired to produce in the gas purification system.

My invention presents an inexpensive and advantageous process of gas purification in which the precipitation of alkaline earth metal in the form of carbonate, incident to prior processes of gas purification, has been substantially eliminated by the provision of an alkaline earth metal thio-arsenic compound stable in the presence of carbon dioxide. My invention further discloses advantageous methods of maintaining a gas purification solution used for such a process.

I claim as my invention:

1. The process of purifying gas from acidic impurities which comprises washing the gas with a solution of an alkaline earth metal compound of a metal of the tin group of qualitative analysis.

2. The process of purifying gas from acidic impurities which comprises washing the gas with a solution of a compound of an alkaline earth metal and a metal of the tin group of qualitative analysis.

3. The process of purifying gas from acidic impurities which comprises washing the gas with a solution of an alkaline earth metal compound of arsenic.

4. The process of purifying gas from acidic impurities which comprises washing the gas with a solution of a thio-arsenic compound of an alkaline earth metal.

5. The process of purifying gas from acidic impurities which comprises washing the gas with a partially sulphided solution of an alkaline earth metal arsenic compound.

6. The process of purifying gas from acidic impurities which comprises washing the gas with a solution of a previously sulphided and oxidized alkaline earth metal arsenic compound.

7. The process of purifying gas from acidic impurities which comprises washing the gas with a solution of an alkaline earth metal thio-arsenic compound containing from about 0.5% to 1.0% of arsenic considered as $As_2O_3$.

8. The process of purifying gas from acidic impurities which comprises washing the gas with a solution of an alkaline earth metal thio-arsenic compound containing about 0.8% of arsenic.

9. The process of purifying gas from acidic impurities which comprises recirculating a solution of an alkaline earth metal arsenic compound over the gas for removal of impurities and through an aeration stage for revivification of the solution.

10. The process of purifying gas from hydrogen sulphide and analogous acidic impurities which comprises recirculating a solution of an alkaline earth metal arsenic compound over the gas for removal of impurities and through an aeration stage for revivification of the solution, and removing sulphur liberated in said aeration stage.

11. The method of maintaining the strength of a solution of alkaline earth metal thio-arsenic compound used for gas purification which comprises supplying thereto an alkaline earth metal compound and a mixture of an arsenic compound and an alkali.

12. The method of maintaining the strength of a solution of alkaline earth metal thio-arsenic compound used for gas purification which comprises supplying thereto an alkaline earth metal compound and a mixture of arsenous oxide and sodium carbonate.

In testimony whereof, I have hereunto subscribed my name this 3rd day of March, 1927.

HERBERT A. GOLLMAR.